Patented Aug. 18, 1953

2,649,458

UNITED STATES PATENT OFFICE 2,649,458

2-THIONO-5-OXAZOLIDONES

George E. Bennett and John B. Ott, Dayton, Ohio, assignors to Monsanto Chemical Company, St. Louis, Mo., a corporation of Delaware No Drawing. Application April 30, 1951,
Serial No. 223,834

6 Claims. (Cl. 260—307)

This invention relates to a new class of protein intermediates. More specifically the invention relates to a useful class of amino acid derivatives which are exceptionally useful in the synthesis of polypeptides and other protein polymers.

It is well-known that proteins can be synthesized from amino acids. Furthermore methods of converting amino acids into more reactive derivatives are used to facilitate the polymerization and interpolymerization steps. These more reactive derivatives, for example, the N-carboxy anhydrides which are otherwise known as 2,5-oxazolidinediones, are often so sensitive to moisture that they cannot be stored except under strictly anhydrous conditions. This property of the intermediates greatly restricts the practical application of the reaction in the preparation of polypeptides.

The principal purpose of this invention is to provide a class of stable intermediates which are much less reactive with moisture vapor than are the N-carboxy anhydrides. A further purpose is to provide a novel method of preparing polypeptides. A still further purpose of this invention is to provide a new class of amino acid derivatives hereinafter described.

It has been found that the 2-thiono analogues of the various N-carboxy amino acid anhydrides are unusually stable under conditions which favor the rapid decomposition of the N-carboxy anhydrides. The new thiono compounds may be represented by the generic structural formula:

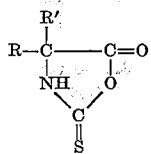

wherein R is a radical of the group consisting of hydrogen, alkyl and aralkyl, and R' is a radical of the group consisting of hydrogen and methyl.

The new chemical compounds may be prepared from the corresponding amino acids by first reacting them with an ester of thionochloroformic acid and thereafter treating the resulting N-thiono esters of the amino acids with thionyl chloride or phosphorus pentachloride. The first of these reactions is conducted at room temperature in solution in a suitable anhydrous solvent. The second step may involve the reaction of thionyl chloride on the solid intermediate or the reaction between the intermediate and phosphorus pentachloride in a suitable inert solvent. The latter reaction may also be accomplished at room temperature or slightly above. Upon removing the solvents and/or excess reagents by warming under reduced pressures, the desired 2-thiono-5-oxazolidones are recovered as solid residues.

An alternative procedure involves the use of thiophosgene by reaction of which with the amino acids or salts thereof the desired compounds can be obtained directly. The reaction is effected at temperatures of from 20° C. to 100° C. in inert solvents, preferably those which are poor solvents for the 2-thione-5-oxazolidones, from which they are precipitated during the reaction or on cooling at the end of the reaction.

The following new compounds can be prepared from available amino acids, although others included within the scope of the claims can be prepared from other analogous amino acids.

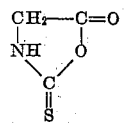

from (glycine) 2-thione-5-oxazolidone

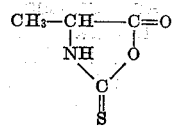

(from alanine) 4 - methyl-2-thiono - 5 - oxazolidone

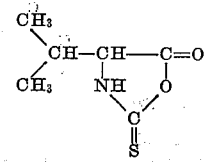

(from valine) 4-isopropyl-2-thiono - 5 - oxazolidone

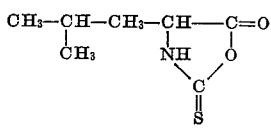

(from leucine) 4-isobutyl-2-thione - 5 - oxazolidone

The new compounds are useful as intermediates in the preparation of a variety of chemical products. Polypeptides, both polymers and copolymers of the amino acids can be readily prepared from the intermediates, and in this form, are useful as foodstuffs, pharmaceuticals or as raw materials in the fabrication of films and fibers.

Further details of the invention are set forth with respect to the following examples:

Example 1

A 500-ml., three-necked flask, provided with a mechanical stirrer, a thermometer, and a drying tube was charged with 35.5 grams of N-carbothionomethoxy-α-aminoisobutyric acid and 200 ml. of ether. The mixture was cooled to 0° C. and 52.1 grams of phosphorus pentachloride was added in increments at a rate which permitted the maintenance of a temperature below 5° C. As the reaction proceeded a solid product was precipitated. The resulting suspension was then treated with 100 ml. of dry ethyl acetate to form a clear solution upon stirring at 0° C. for one-half hour. The solvents were removed by heating to 30° C. under an aspirator pressure and finally at from 40° C. to 45° C. at about two mm. total pressure. The crystalline product so obtained was dissolved in 100 cc. of ethyl acetate treated with activated charcoal and again evaporated to dryness. The residue was washed with an ether-hexane mixture and produced a white crystalline product with a melting point of from 113° C. to 115° C. The crystalline product was identified as 4,4-dimethyl-2-thiono-5-oxazolidone with the structure:

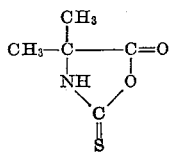

*Example 2*

Using the apparatus described in the preceding example, 91 grams of N-carbothionomethoxy-phenylalanine was reacted with 110 ml. of thionyl chloride for 30 minutes at room temperature and then for fifteen minutes at 40° C. The excess thionyl chloride was removed by applying an aspirator pressure at 40° C. for one hour and then at 60° C. to 65° C. until further heating produced no reduction in weight. The residue was dissolved in acetone and treated with activated charcoal. The solution was evaporated to dryness and the product identified as 4-benzyl-2-thiono-5-oxazolidone having the following structural formula:

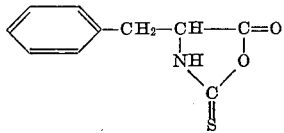

*Example 3*

The comparative stability of the 4,4-dimethyl-2-thiono-5-oxazolidone and the corresponding non-thio compound, 4,4-dimethyl-2,5-oxazolidinedione, was demonstrated by exposing 0.5 gram samples to moisture-saturated air in a closed vessel at room temperatures. After exposure of the samples for pre-determined periods of time, the acetone insoluble contents of the samples were measured. The following table sets forth the observed data:

| Time (Hours) | Acetone Insoluble Content | |
| --- | --- | --- |
| | Thiono derivative | Control |
| 0 | 2.15 | 1.80 |
| 21 | 2.45 | 7.43 |
| 45 | 2.7 | 17.6 |
| 69 | 3.65 | 52.0 |

The above data demonstrate that in sixty-nine hours only 1.4 per cent of the thiono compound decomposed spontaneously, whereas in excess of 50 per cent of the control compound, the 4,4-dimethyl-2,5-oxazolidinedione, was decomposed.

The invention is defined by the following claims.

What we claim is:

1. As a new chemical compound, the amino acid derivative having the structural formula:

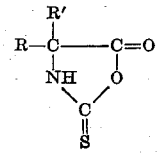

wherein R is a radical of the group consisting of hydrogen, lower alkyl and benzyl and R' is a radical of the group consisting of hydrogen and methyl.

2. As a new chemical compound, 4,4-dimethyl-2-thiono-5-oxazolidone.

3. As a new chemical compound, 4-benzyl-2-thiono-5-oxazolidone.

4. As a new chemical compound, 2-thiono-5-oxazolidone.

5. As a new chemical compound, 4-isopropyl-2-thiono-5-oxazolidone.

6. As a new chemical compound, 4-isobutyl-2-thiono-5-oxazolidone.

GEORGE E. BENNETT.
JOHN B. OTT.

References cited.
Rouiller, C. A., vol. 14 (1920), page 47.